United States Patent
Meenan et al.

(10) Patent No.: US 8,468,254 B2
(45) Date of Patent: Jun. 18, 2013

(54) SWITCHING BETWEEN CONNECTIVITY TYPES TO MAINTAIN CONNECTIVITY

(75) Inventors: Patrick Meenan, Gainesville, VA (US); David Clyde Chiles, Mitchellville, MD (US); Jeffrey J. Damick, Manassas, VA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 12/966,593

(22) Filed: Dec. 13, 2010

(65) Prior Publication Data

US 2011/0078502 A1 Mar. 31, 2011

Related U.S. Application Data

(63) Continuation of application No. 12/184,304, filed on Aug. 1, 2008, now Pat. No. 7,853,702, which is a continuation of application No. 10/448,176, filed on May 30, 2003, now Pat. No. 7,409,451.

(51) Int. Cl.
*G06F 15/16* (2006.01)

(52) U.S. Cl.
USPC .......... 709/227; 709/219; 709/229; 709/224; 709/225; 709/223; 726/4; 726/12; 726/8; 714/11

(58) Field of Classification Search
USPC ................ 709/227, 229, 228, 224, 223, 203, 709/225, 219
See application file for complete search history.

(56) References Cited

U.S. PATENT DOCUMENTS

| | | | |
|---|---|---|---|
| 4,352,180 A | 9/1982 | Schulze | |
| 6,341,312 B1 | 1/2002 | French et al. | |
| 6,385,647 B1 | 5/2002 | Willis et al. | |
| 6,487,596 B1 | 11/2002 | Douglis et al. | |
| 6,714,534 B1 | 3/2004 | Gerzberg et al. | |
| 6,766,373 B1 | 7/2004 | Beadle et al. | |
| 7,023,973 B2 | 4/2006 | Gupta | |
| 7,107,348 B2 | 9/2006 | Shimada et al. | |
| 7,139,822 B2 | 11/2006 | Guenther et al. | |
| 7,225,226 B2 | 5/2007 | Fitzpatrick et al. | |
| 7,406,030 B1 | 7/2008 | Rijsman | |
| 7,409,451 B1 * | 8/2008 | Meenan et al. | 709/227 |
| 7,502,726 B2 * | 3/2009 | Panasyuk et al. | 703/22 |
| 7,853,702 B2 * | 12/2010 | Meenan et al. | 709/227 |
| 8,090,874 B2 * | 1/2012 | Panasyuk et al. | 709/246 |
| 2002/0003794 A1 | 1/2002 | Hallenstal et al. | |
| 2002/0035699 A1 | 3/2002 | Crosbie | |
| 2003/0117950 A1 | 6/2003 | Huang | |
| 2004/0078626 A1 | 4/2004 | Li | |
| 2004/0196833 A1 | 10/2004 | Dahan et al. | |
| 2004/0242230 A1 | 12/2004 | Rue | |
| 2006/0117106 A1 | 6/2006 | Abdo et al. | |

\* cited by examiner

*Primary Examiner* — Jude Jean Gilles
(74) *Attorney, Agent, or Firm* — Workman Nydegger

(57) ABSTRACT

Techniques are provided for leveraging narrowband connectivity (such as dial-up communications or other types of low bandwidth communications) to provision or configure broadband connectivity between a broadband access provider and a broadband device, such as a DSL modem or a cable modem. Specifically, because narrowband connectivity does not require advance configuration or provisioning by the host system of connectivity parameters for an access-seeking device, a modem at an access-seeking device may be leveraged to establish a narrowband connection between that device and a host system and to enable an exchange or negotiation of connectivity parameters necessary to enable future broadband connectivity. Thus, once established, the narrowband connection may be used as a conduit for communicating required provisioning information between the broadband-enabling host and the access-seeking device to enable broadband connectivity by the device in the future.

20 Claims, 7 Drawing Sheets

SWITCHING BETWEEN CONNECTIVITY TYPES TO MAINTAIN CONNECTIVITY

RELATED APPLICATIONS

This application is a continuation of U.S. application Ser. No. 12/184,304, filed on Aug. 1, 2008 (now U.S. Pat. No. 7,853,702), which is a continuation of U.S. application Ser. No. 10/448,176, filed May 30, 2003 (now U.S. Pat. No. 7,409,451), each of which is incorporated herein by reference.

TECHNICAL FIELD

This description relates to communicating between two systems.

BACKGROUND

When two systems communicate, the systems may experience an unintended interruption of the communications session. To continue communications when faced with such an interruption, one system must initiate communications to reestablish the communications session. In fact, where one of the systems or the communication channel there between is secured, an interruption generally requires the system seeking access to resubmit authentication information before communications can be reestablished. Such interruptions often disrupt applications on one of the systems.

SUMMARY

In one general aspect, enabling communications between a user system and an accessible system involves detecting a communications failure in a communications session between a user system and an accessible system. The communications session leverages a first connectivity type. A second communications session between the user system and the accessible system is established in which the second communications session leverages a second connectivity type that differs from the first connectivity type. The second communications session is established automatically in response to the detected communication failure on the session leveraging the first connectivity type.

Implementations may include one or more of the following features. For example, the second communications session leveraging the second connectivity type may be established without requiring user manipulation. The first connectivity type may be broadband connectivity, the second connectivity type may be narrowband connectivity.

Using the second communications session leveraging the second connectivity type to receive connectivity information regarding the detected communications failure, status or problem of the first connectivity type, status or problem of the user system, and status or problem of the accessible system and status or problem of a communication pathway between the user system and the accessible system leveraging the first connectivity type.

The accessible system may be a secure system. When the accessible system is a secure system, the receipt of authentication information from the user system may be enabled. A token may be used to transparently establish the second communications session leveraging the second connectivity type such that at least one of the applications making use of the first communications session is unaffected by the interruption of the first communications session and the establishment of the second communications session.

The availability of the first connectivity type for communications between the user system and the accessible system may be detected. A third communications session between the user system and the accessible system may be established in which the third communication session leverages the first connectivity type. The first connectivity type may be leveraged automatically in response to the detected availability of the first connectivity type. A token may be used to transparently establish the third communications session leveraging the first connectivity type such that at least one of the applications making use of the second communications session is unaffected by the interruption of the second communications session and the establishment of the third communications session.

In another general aspect, enabling communications between a user system and an accessible system involves using a communications session of a first connectivity type between the user system and the accessible system. A second connectivity type is leveraged to enable communication of connectivity information to the accessible system regarding the first connectivity type.

Implementations may include one or more of the features noted above and one or more of the following features. The communications session may be established automatically in response to a detected communication failure of another communications session leveraging the first connectivity type.

Implementations of any of the techniques discussed above may include a method or process, an apparatus or system, or computer software on a computer-accessible medium.

The details of one or more implementations set forth in the accompanying drawings and the description below. Other features will be apparent from the description and drawings, and from the claims.

For brevity, several elements in the figures are represented as monolithic entities. However, as would be understood by one skilled in the art, these elements each may include numerous interconnected computers and components designed to perform a set of specified operations and/or dedicated to a particular geographical region.

DETAILED DESCRIPTION

In the event of an unintentional interruption in communications using a broadband connection between a host system and a client system, a narrowband connection may be established and used until the broadband connection is reestablished. Once the broadband connection is reestablished, communications may use the broadband connection and the narrowband connection may be disconnected.

Figure 1:
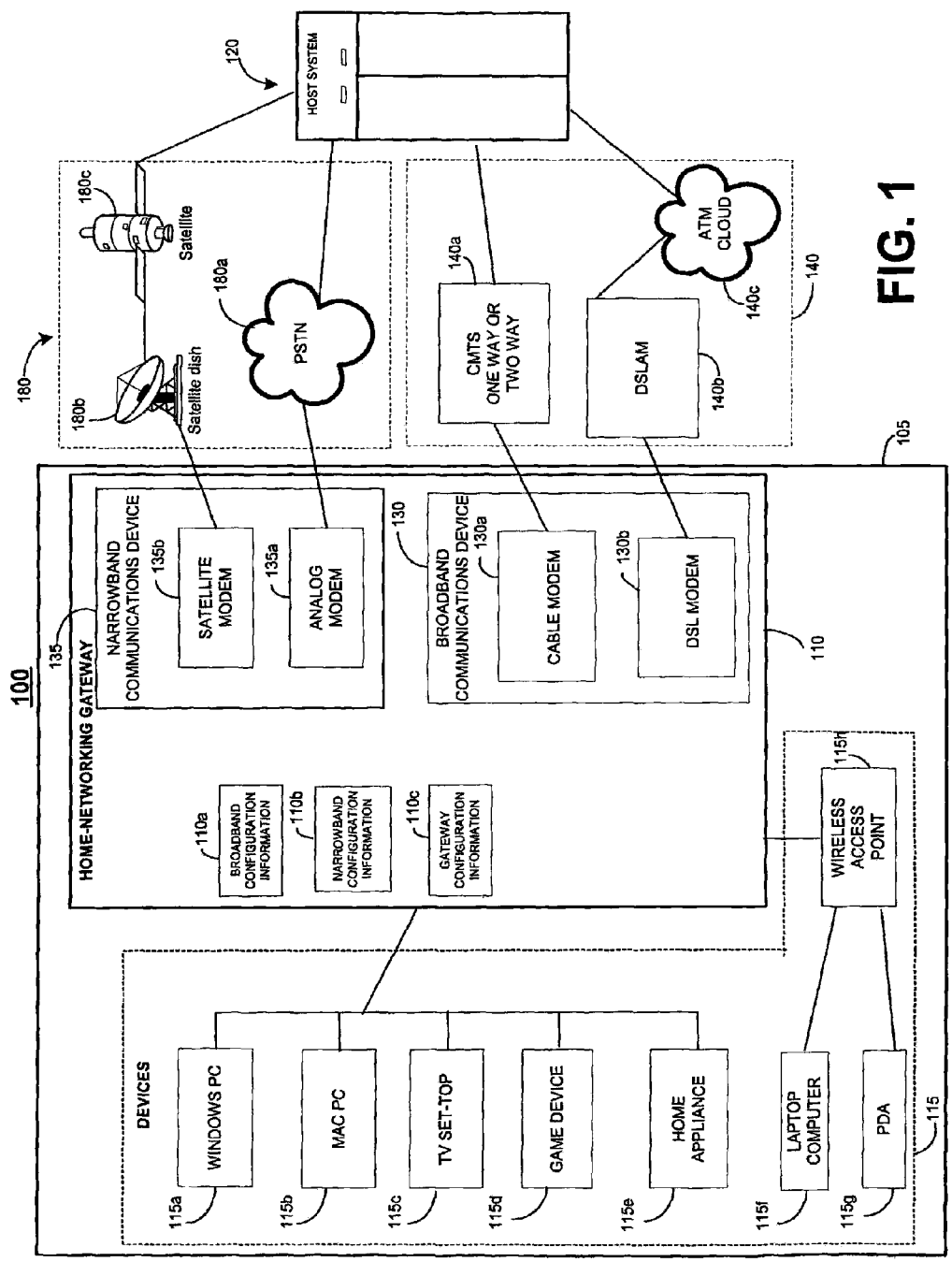
FIGS. 1-3 are block diagrams illustrating exemplary communications systems capable of switching between a broadband connection and a narrowband connection.

FIG. 1 shows a communications system 100 that includes a client system 105 having a home-networking gateway 110 and multiple home-networked devices 115 ("devices") connected to each other and to the home-networking gateway 110. The communications system 100 enables the devices 115 to communicate with the host system 120 using the broadband communications device 130 or the narrowband communications device 135 of the home-networking gateway 110.

The devices 115, the home-networking gateway 110, and the communications devices 130 and 135 of client system 105 may be physically located in a personal residence (e.g., a single-family dwelling, a house, a townhouse, an apartment, or a condominium). However, the location of the home-networking gateway 110 in the personal residence does not necessarily preclude one or more of the devices 115 from being networked to the home-networking gateway 110 from a remote location. Similarly, the location of the home-networking gateway 110 in the personal residence does not necessarily preclude use of one or more of the devices 115 from outside of the personal residence or communication by those devices with the host system 120 through the home-networking gateway 110. For instance, the devices 115 may include one or more portable computing devices that may be taken outside of the personal residence and still remain connected through a wireless access point to the home-networking gateway 110 located within the personal residence.

The home-networking gateway 110 is located logically between the devices 115 and a host system 120 that is external to the client system 105. The host system 120 may be, for example, an Internet access provider device, an Internet service provider device, an online system proxy server, or another external system device.

The devices 115 may include one or more general-purpose computers (e.g., personal computers), one or more special-purpose computers (e.g., devices specifically programmed to communicate with the home-networking gateway 110 and/or the host system 120), or a combination of one or more general-purpose computers and one or more special-purpose computers. Other examples of devices 115 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture.

As illustrated by FIG. 1, examples of devices 115 may include, but are not limited to, a personal computer with a Windows™ OS 115a, a Macintosh™ personal computer 115b, a TV set-top box 115c, a game device 115d, a home appliance 115e, a laptop or otherwise portable computer 115f, a personal digital assistant (PDA) 115g, and a wireless access point (WAP) 115h. Some of the devices, such as a personal computer with Windows™ OS 115a, a Macintosh™ personal computer 115b, a TV set-top box 115c, a game device 115d, and a home appliance 115e, typically communicate with the home-networking gateway 110 through a wired network.

Some of the other devices, such as a laptop computer 115f and a PDA 115g, typically communicate with the home-networking gateway 110 using a wireless access point 115h. When a device communicates using wireless access point 115h, the device may be referred to as a wireless device. Wireless devices may include, but may not be limited to portable devices. For example, a desktop personal computer, such as a personal computer with a Windows™ OS 115a or a Macintosh™ personal computer 115b, may communicate using wireless access point 115h. Typically, the wireless access point 115h is connected to home-networking gateway 110 through the wired network, such that the wireless access point 115h transmits to the home-networking gateway 110 communications received over a wireless communications pathway from wireless devices.

A wireless communications pathway may use various protocols to communicate from a wireless device to a wireless access point 115h. For example, the wireless communications pathway may use wireless technology based on the Institute of Electrical and Electronics Engineers, Inc. (IEEE) 802.11 standard (such as 802.11b or 802.11a). The wireless communications pathway also may use wireless technology based on the Bluetooth approach for short range wireless communications, other personal area network (PAN) technologies, or other wireless technology, such as the HiperLan2 standard by the European Telecommunications Standards Institute (ETSI).

Some of the devices 115, such as personal computer with Windows™ OS 115a, Macintosh™ personal computer 115b, laptop computer 115f, and PDA 115g, include software for logging on to the host system 120 using a particular client application that is associated with, or that identifies, the user of the device. Such devices may be referred to as client devices. Other devices, such as home appliance 115e, may include software for logging on to host system 120 without identifying an associated user of the device. Yet other devices, such as TV set-top 115c and game device 115d, may be configured to function either as a client device or a non-client device depending on the function being performed.

The home-networking gateway 110 may include a home gateway device, such as a gateway, a router, or another communication device. The home-networking gateway 110 also may include a digital hub capable of receiving broadcast video signals, receiving communication data (such as through a broadband connection), and distributing the signals and data to devices 115. The home-networking gateway 110 may include another communications device and/or a home entertainment device, such as a stereo system, a radio tuner, a TV tuner, a portable music player, a personal video recorder, and a gaming device.

The home-networking gateway 110 may communicate with the host system 120 over broadband communications links 140. The home-networking gateway 110 typically connects to the host system 120 using a broadband communications device 130. Examples of the broadband communications device 130 may include (and are not limited to) a cable modem 130a and a DSL modem 130b. The broadband communications links 140 may include various types of communication delivery systems that correspond to the type of broadband communications device 130 being used. For example, if the home-networking gateway 110 includes a cable modem 130a to communicate with the host system 120, the cable modem 130a typically uses the CMTS 140a to deliver and receive communications from the host system 120. In contrast, the DSL modem 130b typically delivers and receives communications with the host system 120 through a Digital Subscriber Line Access Multiplexer (DSLAM) 140b and an Asynchronous Transfer Mode (ATM) network 140c.

The home-networking gateway also may communicate with host system 120 using a narrowband communications device 135. Examples of the narrowband communications device 135 may include (and are not limited to) an analog modem 135a and a satellite modem 135b. The home-networking gateway 110 uses the narrowband communications device 135 to communicate with the host system 120 through narrowband communications links 180. The narrowband communications links 180 may include various types of communication delivery systems that correspond to the type of narrowband communications device 135 being used. For example, the analog modem 135a may use the Public Switched Telephone Network (PSTN) 180a (which also may be referred to as the Plain Old Telephone Service or POTS). When the home-networking gateway 110 includes a satellite modem 135b, then the communications from a device 115 and an associated home-networking gateway 110 may be delivered to the host system 120 using a satellite dish 180b and a satellite 180c.

The communications system 100 may use various protocols to communicate between the devices 115 and the home-networking gateway 110 and between the home-networking gateway 110 and the host system 120. For example, a first protocol may be used to communicate between the devices 115 and the home-networking gateway 110, and a second protocol may be used to communicate between the home-networking gateway 110 and the host system 120, where the first protocol and the second protocol may be the same or different protocols. As such, the home-networking gateway 110 may include different hardware and/or software modules to implement different home networking system protocols.

The home-networking gateway 110 may include broadband configuration information 110a that may include information for establishing and/or using a broadband connection to communicate with the host system 120. Broadband configuration information may include a media access control (MAC) address for the broadband communications device 130; a user account, a password, a realm string or another type of identifying information for the broadband account; and a network address (such as an Internet Protocol (IP) address) used to establish a broadband connection between the home-networking gateway 110 and the host system 120. The broadband configuration information 110a may be stored in a table or a list on the home-networking gateway 110.

The home-networking gateway 120 also may store narrowband configuration information 110b. The narrowband configuration information 110b may include connectivity parameters (such as a username and password), one or more access telephone numbers, and other information to establish a narrowband connection with the host system 120. The home-networking gateway configuration information 110b may be stored in a table or a list on the home-networking gateway 110.

The home-networking gateway 110 also may store home-networking gateway configuration information 110c that may include identifying information associated with the home-networking gateway 110, such as a MAC address. The home-networking gateway configuration information 110c also may include device information associated with each device, such as one of devices 115, that may connect to the home-networking gateway 110. The device information may include a device identifier for the device, such as its MAC address, a network address (such as a static IP address associated with the device or a dynamic IP address), or other type of hardware device identifier. The dynamic IP address may be assigned to a device by the home-networking gateway 110 or by some other network device through the Dynamic Host Configuration Protocol (DHCP) or another protocol that enables the dynamic allocation of an IP address to a device on a network.

The device information associated with each device also may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a PDA, a home appliance, or an entertainment device), and/or the operating environment (e.g., the operating system type and/or version).

In addition, the device information may include a user-assigned name. The user-assigned name may be referred to as a familiar name or a nickname. For example, an identifier for a particular game device may be associated with the user-assigned name of "Billy's game device." The device information also may include parental control information or other types of access restrictions that are associated with the device.

The home-networking gateway configuration information 110c may include protocol information necessary to configure the home-networking gateway 110 to communicate with devices 115, such as information describing how to establish communications with one or more of devices 115, how to configure the wireless access point 115h, or how to configure wireless devices, such as the laptop computer 115h or the PDA 115g using the wireless configuration information. Wireless configuration information may include a security key, such as a wired equivalent privacy (WEP) key that may be used to encrypt and decrypt transmitted data, and a wireless network name, such as a service set identifier (SSID) that identifies the particular network. The wireless configuration information may include other configuration information, such as a level of encryption (e.g., 40-bit encryption or 128-bit encryption) associated with a WEP key.

The home-networking gateway configuration information 110c may include a list of devices that are permitted access to the home network. For example, the home-networking gateway configuration information 110a may include a list of MAC addresses that uniquely identify the devices that are permitted access to the home network.

Additionally or alternatively, the home-networking gateway 110 may communicate with devices using only a wireless communications pathway. In other implementations, the home-networking gateway 110 may communicate with devices using only a wired communications pathway.

In some implementations the broadband communications device 130 and/or the narrowband communications device 135 may be external to the home-networking gateway 110 in addition to, or in lieu of, the broadband communications device 130 and the narrowband communications device 135 included in the home-networking gateway 110, as shown in FIG. 1. When a communications device is included in the home-networking gateway, the two devices may be said to be "integrated" (e.g., the home-networking gateway may be said to include an integrated communications device). Similarly, in some implementations, a wireless access point 115h may be included in the home-networking gateway 110 in lieu of, or in addition to, wireless access point 115h that is external to the home-networking gateway 110, as shown in FIG. 1.

The home-networking gateway 110 may be configured to automatically establish a narrowband connection between the client system 105 and the host system 120 in the event of an unintentional interruption in communications using a broadband connection established between the host system 120 and the client system 105. The client system 105 may use the narrowband connection for communications with the host system 120 until the broadband connection is available/reestablished. Once broadband access is available, the home-networking gateway 110 may automatically reestablish broadband connectivity for communications between the client system 105 and the host system 120 and may disconnect the narrowband connection with the host system 120.

In some implementations, the home-networking gateway 110 may be configured to automatically establish the narrowband connection in the event of an unintended interruption of a broadband connection such that at least one of the applications making use of the broadband communications session is unaffected by the interruption and the reestablishment of the communications session using the narrowband connection.

In some implementations, the home-networking gateway 110 also may be configured to provide, automatically without user manipulation, information regarding the problem(s) leading or incident to an interruption in the broadband connectivity. The home-networking gateway 110 may send a message to the host system 120 to report the problem with the broadband connection, or the home-networking gateway 110 may connect directly to a problem reporting system of the host system 120 to report the problem.

Figure 2:
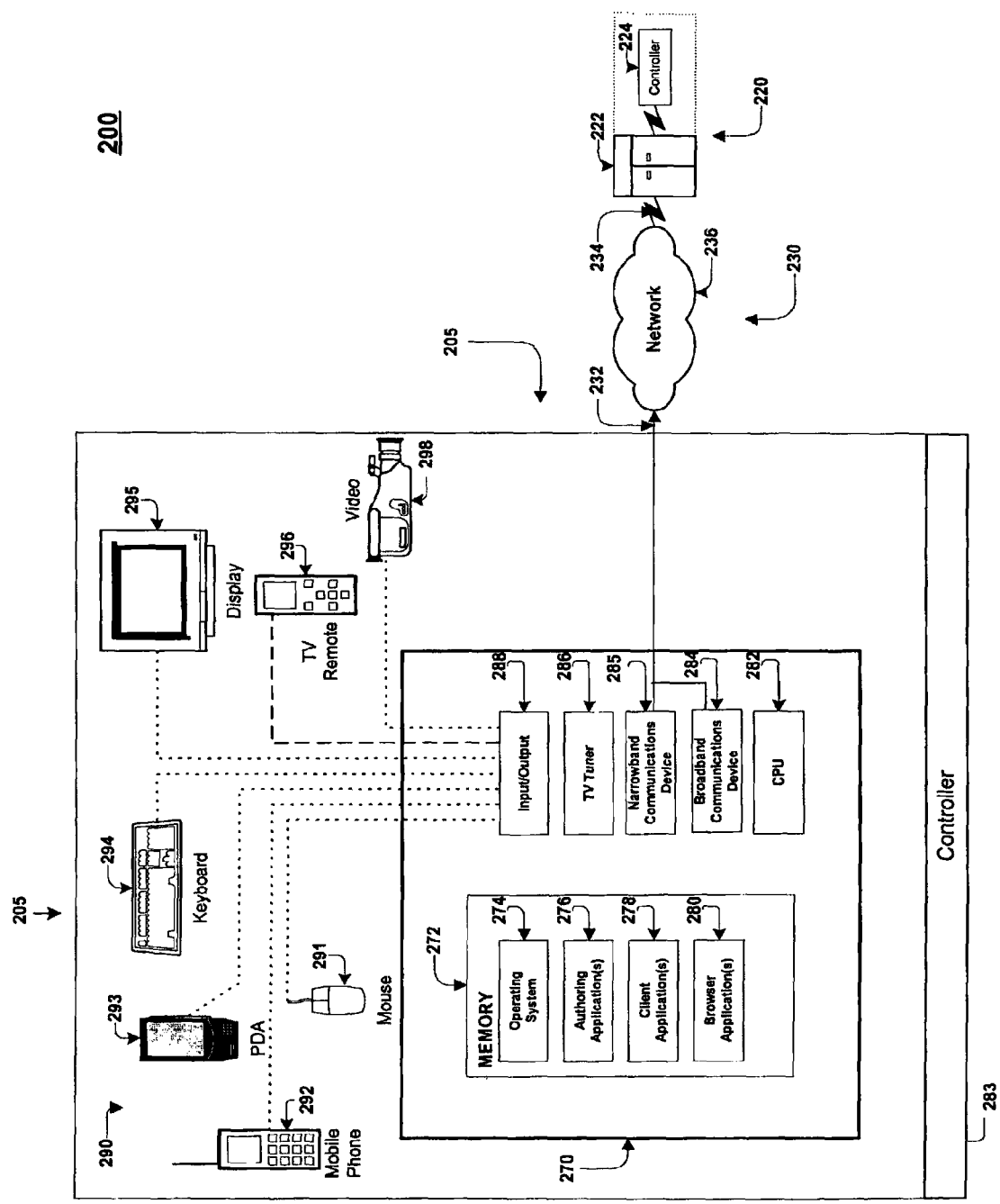

FIG. 2 illustrates a communications system 200 including a client system 205 communicating with a host system 220. In contrast with the communications system 100 of FIG. 1, the communications system 200 does not include as part of the client system 205 a home-networking gateway, such as home-networking gateway 110.

The host system 220 includes a host device 222 and a host controller 224. The host device 222 and the host controller 224 each typically include one or more hardware components and/or software components. An example of a host device 222 is a general-purpose computer capable of responding to and executing instructions in a defined manner. Other examples include a special-purpose computer, a workstation, a server, a device, a component, or other physical or virtual equipment or some combination thereof capable of responding to and executing instructions.

An example of the host controller 224 is a software application loaded on the host device 222 for commanding and directing communications enabled by the host device 222. Other examples include a program, a piece of code, an instruction, a device, a computer, a computer system, or a combination thereof, for independently or collectively instructing the host device 222 to interact and operate as described. The host controller 224 may be embodied permanently or temporarily in any type of machine, component, physical or virtual equipment, storage medium, or propagated signal capable of providing instructions to the host device 222.

The client system 205 communicates with the host system 220 through communications links 230. The communications link 230 may include or leverage communications pathways 232, 234, enabling communications through the one or more delivery networks 236. Examples of a delivery network include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, TV, cable, satellite, and/or any other delivery mechanism for carrying data. Each of the communications pathways 232, 234 may include, for example, a wired, wireless, cable or satellite communications pathway.

The client system 205 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, Macintosh OS, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., an America Online (AOL) client, CompuServe client, America Online Instant Messaging (AIM) client, AOL TV ("television") client, and an Internet service provider (ISP) client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 283. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer typically includes a broadband communications device 284, such as the cable modem 130a or the DSL modem 130b of FIG. 1, and a narrowband communications device 285, such as a analog modem 135a and a satellite modem 135b of FIG. 1, for sending and receiving data. Other examples of a communications device 284 or 285 include a transceiver, a set-top box, a communication card, a satellite dish, an antenna, or another network adapter capable of transmitting and receiving data over the communications link 230 through a wired or wireless data pathway 232.

The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 or 285 and television programming content received by the TV tuner 286.

The general-purpose computer 270 typically includes an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as the mobile telephone 292, the PDA 293, and the TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 230 and communicating with the host system 220. Furthermore, the client system 205 may include one, some, all, or none of the components and devices described above.

The client system 205 may be configured to automatically establish a narrowband connection with the host system 220 in the event of an unintentional interruption in communications using a broadband connection. The client system 205 may use the narrowband connection for communications with the host system 220 until the broadband connection is reestablished. Once broadband access is available, the client system 205 may automatically reestablish broadband connectivity for communications with the host system 220 and may disconnect the narrowband connection with the host system 220.

In some implementations, the client system 205 may be configured to automatically establish the narrowband connection in the event of an unintended interruption of a broadband connection such that at least one of the applications making use of the broadband communications session is unaffected by the interruption and the reestablishment of the communications session using the narrowband connection. For example, an application making use of the broadband communications may be unaffected by the interruption and reestablishment when the application is not affected operationally or when it is affected only by the potential of a change in processing speed or responsiveness to user manipulation. In such cases, the application does not fail, become inoperative, or report an error to the user of the application. A user of the application may become aware of a communication speed change that may result from switching from a broadband connectivity type to a slower narrowband connectivity type. The user may experience delay or greater response time in the application even though the user does not experience an application failure or operational error.

Additionally, the client system 205 also may be configured to automatically report the problem with broadband connectivity. The client system 205 may send a message to the host system 220 to report the problem with the broadband connection or may directly connect to a problem reporting system of the host system 220 to report the problem.

Figure 3:
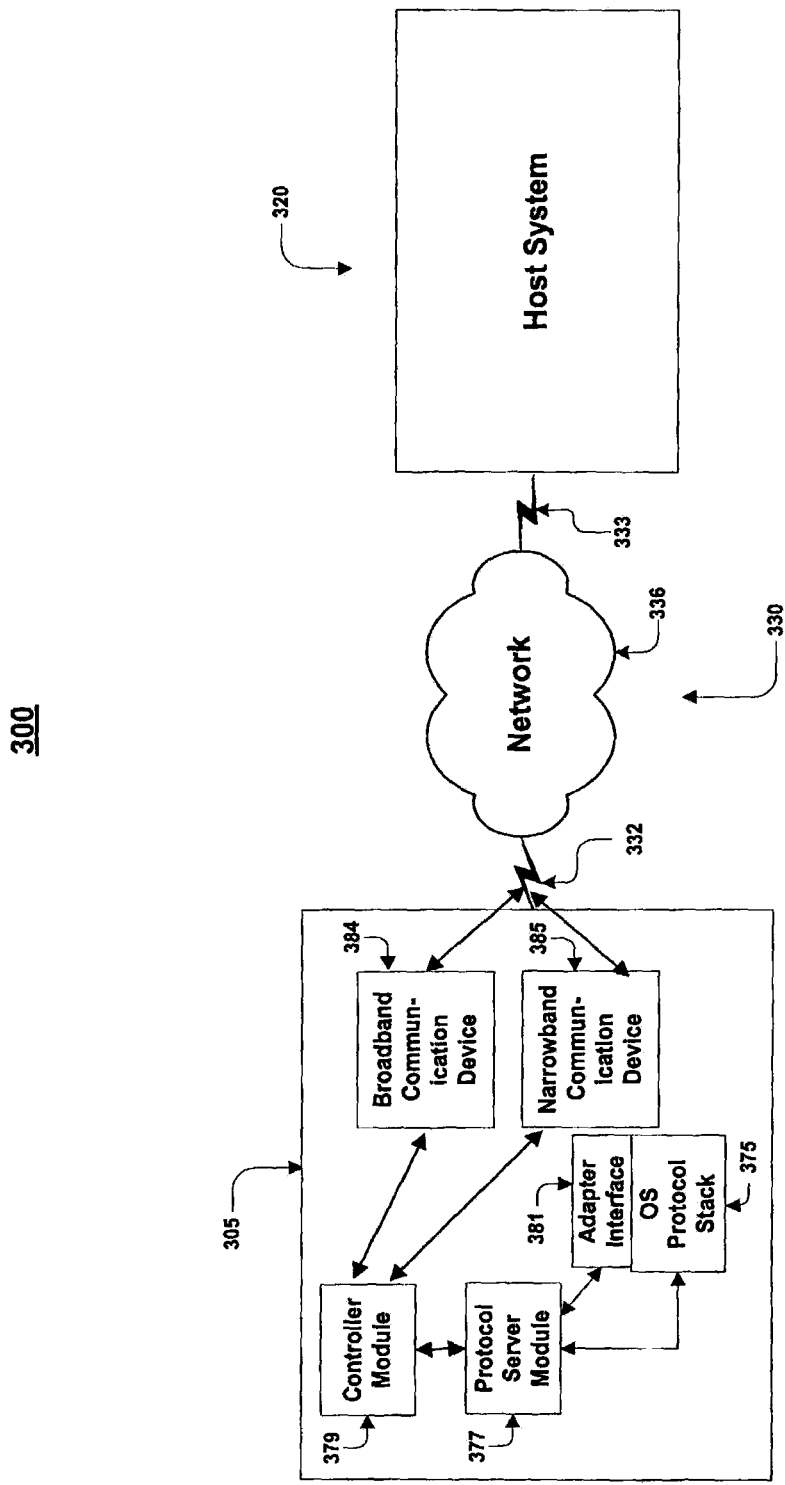

FIG. 3 shows an implementation of a communications system 300 that includes a client system 305, a host system 320, and a communications link 330. The client system 305 may include one or more of an OS protocol stack 375, a protocol server module 377, a controller module 379, an optional adapter interface 381, a broadband communications device 384, and a narrowband communications device 385. The OS protocol stack 375 may be included as part of an operating system ("OS"). The OS protocol stack 375 may be designed for or capable of enabling the OS to encapsulate data for communication. In general, the OS protocol stack 375 may be implemented using a PPP ("Point-to-Point Protocol") interface. For example, Windows™ OSs generally include a NDISWAN ("Network Device Interface Specification for Wide Area Networks") component that functions as the PPP interface. In some Windows™ OSs and in some other types of OSs, a PPP Daemon (PPPD) may function as the PPP interface.

The protocol server module 377 may be structured and arranged to interface with the client device OS protocol stack 375 and the controller module 379. The protocol server module 377 enables the client system 310 and the host system 320 to communicate through the delivery network 336 using any one of several encapsulating protocols.

The protocol server module 377 may intercept and take over a communications session that the OS protocol stack 375 attempts to initiate with the host system 320 using a first protocol. For example, the OS protocol stack 375 may start a communications session intending to negotiate and exchange configuration data with the host system 320 using the first protocol. Instead, the protocol server module 377 may "spoof" the host system 320 and intercept the communications session from the OS protocol stack 375, rather than having the OS protocol stack 375 communicate directly with the host system 320. The spoofing typically is transparent to the OS protocol stack 375 and the host system 320. By capturing the communications session at the protocol server module 377, the protocol server module 377 may negotiate a separate or a substitute communications session with the host system 320 using a second protocol that is different from the first protocol. Based on this second protocol, data from the OS protocol stack 375 may be routed to the host system 320 over the separate or substitute communications session. Similarly, the protocol server module 377 may be used to spoof the OS protocol stack 375 from the perspective of the host system 320 such that the host system 320 may unknowingly and/or unintentionally transmit to the protocol server module 377 the configuration and/or other data that is destined for the OS protocol stack 375 under the second protocol. The protocol server module 377 then may transport this data to the OS protocol stack 375 using the first protocol.

Data packets that are destined to be communicated between the OS protocol stack 375 and the host system 320 are translated by the protocol server module 377 between the first protocol and the second protocol. For example, when the data packets include encapsulation, the protocol server module 377 may translate the data packets by removing the encapsulation from the data packets. Additionally or alternatively, the protocol server module 377 may translate the data packets by encapsulating previously unencapsulated data packets or re-encapsulating previously encapsulated data packets using any one of several communications protocols.

The protocol server module 377 may interface directly with the OS protocol stack 375, or the client system 305 may further include an interface adapter 381 that the protocol server module 377 uses to interface with the OS protocol stack 375. For instance, in some OSs in which the OS protocol stack 375 is implemented using a PPPD, the protocol server module 377 may interface directly with the PPPD without the need for an interface adapter 317. By contrast, in other OSs, such as the Windows™ OS, in which the OS protocol stack 375 is implemented using NDISWAN, the adapter interface 381 may be used to interface the protocol server module 377 and the NDISWAN protocol stack. More specifically, for example, a WAN ("Wide Area Network") Miniport adapter 381 may be used as a virtual modem to interface the protocol server module 377 and the NDISWAN.

In one implementation, the protocol server module 377 may include a PPP ("Point-to-Point Protocol") server module. When the protocol server module 377 functions as a PPP server module, it may capture a PPP communications session between the OS protocol stack 375 and the host system 320. The PPP server module also negotiates a PPP communications session with the OS protocol stack 375. The PPP server module may translate PPP data packets from the OS protocol stack 375 destined for the host system 320. For example, the protocol server module 377 may translate the data packets by removing the PPP encapsulation. The data packets may include data packets in a format consistent with, for example, Internet Protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP ("User Datagram Protocol"), L2TP ("Layer Two Tunneling Protocol"), and PPP over Ethernet ("PPPoE")). Additionally, the protocol server module 377 may translate data packets from the host system 320 by removing the encapsulation from the data packets and encapsulating the packets in PPP, and then may transport the packets to the client device OS protocol stack 375.

The protocol server module 377 may be configured to enable the client system 305 to communicate with the host system 320 using various encapsulating protocols that are supported by the delivery network 336 and the host system 320, regardless of whether these protocols are otherwise supported by the client system 305. For instance, although a client system 305 may support only a PPP encapsulating protocol through its OS protocol stack 375, the protocol server module 377 may function to enable the client system 305 to communicate through the delivery network 336 with the host system 320 using other encapsulating protocols. In a more specific example, the protocol server module 377 generally enables the client system having only a PPP protocol interface to communicate with the host system 320 using, for example, L2TP, PPP, PPPoE, UDP tunneling, token tunneling (e.g., a P3 tunnel), any other encapsulating protocols and tunneling mechanisms, or a combination of these encapsulating protocols and tunneling mechanisms.

The protocol server module 377 may be implemented as a client application or as a software module within a client application. Examples of client applications include AOL ("America Online") client, a CompuServe client, an AIM ("America Online Instant Messenger") client, an AOL TV ("America Online Television") client, and an ISP ("Internet Service Provider") client capable of communicating with other computer users, accessing various computer resources, and viewing, creating, or otherwise manipulating electronic content). The encapsulation may be performed by the protocol server module 377, or alternatively, it may be performed by a separate client application (e.g., PPP client, UDP client, PPPoE client, L2TP client, or AOL client).

Additionally, the protocol server module 377 may be configured to enable the client system 305 to automatically switch between broadband and narrowband connections in the event of an unintentional interruption in communications using a broadband connection. The protocol server module 377 may be further configured in some implementations to enable the client system 305 to automatically establish the narrowband connection in the event of an unintended interruption of a broadband connection such that at least one of the applications making use of the broadband communications session is unaffected by the interruption and the reestablishment of the communications session using the narrowband connection. Additionally or alternatively, in some implementations, the protocol server module 377 may be configured to enable the client system 305 to automatically report the problem with broadband connectivity.

The controller module 379 may be logically connected to the protocol server module 377 and may be structured and arranged to control communications between the OS protocol stack 375, the protocol server module 377, and the host system 320. The controller module 379 may be implemented as a client application or as a software module within a client. Additionally, the controller module 379 may function to control the broadband communications device 384 and/or the narrowband communications device 385.

The broadband communications device 384 and the narrowband communications device 385 each typically has the attributes of and includes one or more of the communications devices described above with respect to communications devices 130 and 135 of FIG. 1.

The communications link 330 may include communications pathways 332, 334 that enable communications through the one or more delivery networks 336. The delivery network 336 that provides a direct or an indirect communications path between the client system 305 and the host system 320, irrespective of physical separation. Examples of a delivery network 336 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, TV, cable, satellite, and/or any other delivery mechanism for carrying data. Each of the communications pathways 332, 334 may include, for example, a wired, wireless, cable or satellite communications pathway.

Figure 4:
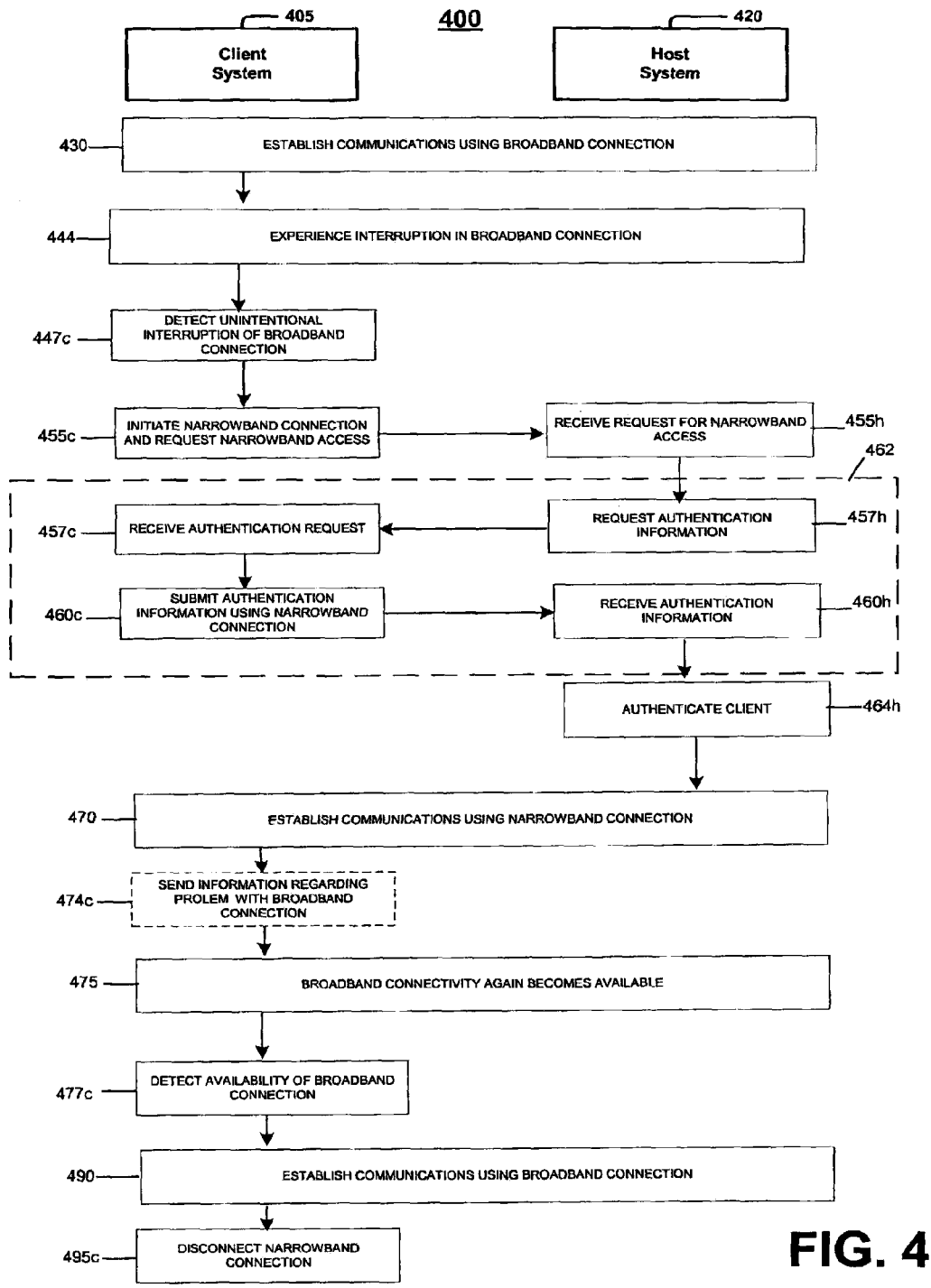
FIG. 4 is a block diagram depicting exemplary communications between a client system and a host system to switch between a broadband connection and a narrowband connection in the event of an interruption in the broadband connection.

FIG. 4 shows an exemplary process 400 between a client system 405 and a host system 420 that automatically switches between a broadband connection and a narrowband connection to provide network access in the event of a disruption of the broadband connection. The client system 405, for example, may be an implementation of the home-networking gateway 110 or the client system 105 both of FIG. 1, the client system 205 of FIG. 2, or the protocol server module 377 or client system 305 both of FIG. 3. The host system 420, for example, may be an implementation of the host system 320 of FIG. 1, the host system 220 of FIG. 2, or the host system 320 of FIG. 3.

The procedure 400 begins when a communications session using a broadband connection is established between the host system 420 and the client system 405 (step 430). The establishment of the communications session may include having the host system 420 authenticate the client system 405 and/or and provide a communication address for the broadband connection.

More specifically, the establishment of the communications session (step 430) may be initiated, for example, when the client system 410 submits a request for access to the host system 420. The host system 420 may request authentication information from the client system 405, which receives the authentication request and submits the requested authentication information. Authentication information may include a user identifier (such as, for example, a user name, a screen name, or a phone number) and access password (such as, for example, a subscriber password or personal identification number ("PIN")), which may be used to authenticate the client system as authorized. The host system 420 receives the authentication information and authenticates the client system.

During the establishment of the communications session (step 430), the host system 420 may provide a host-designated communications address to the client system 405. The host-designated communications address may be, for example, an Internet Protocol address. Alternatively, the communications address may be a port that has been assigned by a Network Address Translator (NAT). The communications address may be a numerical or alphabetical address (such as a domain name).

When the client system 405 and the host system 420 experience an interruption in the communications session (step 444), the client system 405 detects the interruption (step 447c). The interruption in the communications session may occur when the communications session fails—that is, the communication session is interrupted due to a disconnection between the client system 405 and the host system 420. The communications session failure may occur because of a problem with the client system 405, the host system 420, or the communication pathway between the client system 405 and the host system 420.

When the client system 405 includes a home-networking gateway that includes an integrated broadband communications device, such as home-networking gateway 110 of FIG. 1 that includes a DSL modem, the client system 405 may detect the interruption of the broadband connection by detecting the loss of the ATM link. When the client system 505 does not include a home-networking gateway with an integrated broadband communications device, the interruption in the broadband connection may be detected by, for example, a failure in an attempt to communicate with the host system 420 or the receipt of a notice of failure from an application running on the client system 405. The client system 405 also may detect the interruption in the broadband connection when monitoring the broadband connection. For example, the client system 405 may periodically attempt to contact the host system 420 through the broadband connection (e.g., send a ping to the host system 420 and wait for a reply). When a response is not received from the host system 420, the client system detects an interruption in the broadband connection with the host system 420.

Additionally or alternatively, the client system 405 may inform the user of the client system 405 about the interruption, for example, by displaying a message. Informing the user of the client system 405 of the interruption may be beneficial, for example, when the client system dials a modem to reestablish a connection with the host system so that the user is not surprised by the sound of the modem dialing.

The client system 405 initiates a narrowband connection with the host system 420 and requests narrowband access from the host system (step 455*c*). This may be accomplished, for example, when the client system 405 uses a narrowband communications device to establish a narrowband connection, such as a dial-up connection, with the host system 420. In some implementations, identification information (such as user name) may be sent to the host system 420 from the client system 405 when the narrowband connection is initiated. In other implementations, identification information may be sent later, as described below with respect to steps 457*h*-460*h*.

The host system 420 receives the request for narrowband access (step 455*h*). The receipt of the request for narrowband access may enable the host system 420 to detect the communications session interruption when the host system 420 has not yet otherwise detected the interruption of the communications session.

The host system may request authentication information from the client system 405 (step 457*h*), and if so, the client system 405 receives the authentication request (step 457*c*) and submits authentication information using the narrowband connection (step 460*c*). This may be accomplished, for example, by submitting narrowband configuration information stored on the client system, such as narrowband configuration information 110*b*) of FIG. 1. The host system 420 receives the authentication information (step 460*h*).

If the host system 420 has not yet otherwise detected the interruption of the communications session, receiving authentication information from a client system 405 may enable the host system 420 to detect the communications session interruption. The steps 457*h*-460*h* may be referred to as sub-process 462, which may be optionally performed. In some implementations, the request for narrowband access from the client system 405 may include authentication information so as to obviate the need for sub-process 462.

The host system 420 authenticates the client system 405 (step 464*h*).

The client system 405 and the host system 420 exchange communications using the narrowband connection (step 470). Optionally, the client system 405 may provide, without user intervention, information regarding the problem(s) leading or incident to an interruption in the broadband connection to the host system 420 (step 474*c*). This may be accomplished, for example, by the client system 405 sending an electronic mail message or other type of communication to the host system 420 to provide the information regarding the broadband connection. For example, the client system 405 may send an electronic mail ("email") message to a designated email address to report the loss of the broadband connection. The client system 405 may include information about the trouble or about the connection within the email message. For example, the client system 405 may include diagnostic information about the broadband device in the email message. Alternatively or additionally, the client system 405 may report the loss of the broadband connection directly to the host system 420 by connecting to an application program or host service for that purpose (e.g., a trouble-reporting application for technical support or a call center). The client system 405 also may connect directly to a problem reporting system of the host system 420 to provide the information.

When the broadband connection again becomes available (step 475) and the client system 405 detects availability of the broadband connection (step 477*c*), the client system 405 initiates the establishment of communications using the broadband communications (step 490) and disconnects the narrowband connection (step 495*c*). The client system 405 may detect the availability of the broadband connection, for example, by periodically trying to establish a broadband connection with the host system. When the client system 405 includes a home-networking gateway with an integrated DSL modem, such as the home-networking gateway 110 depicted in FIG. 1, the home-networking gateway may be able to detect the availability of the broadband connection based on the reestablishment of the underlying ATM link. When the client system 405 does not include a home-networking gateway with an integrated broadband communications device, the client system 405 may use an active monitoring process to detect the availability of the broadband connection. One example of an active monitoring process is when the client system 405 periodically tries to contact the host system 420 through the broadband connection (e.g., sends a ping to the host system 420 and waits for a reply). When the client system 405 receives a response from the host system 420, the client system determines that the broadband connection is available.

Figure 5A:
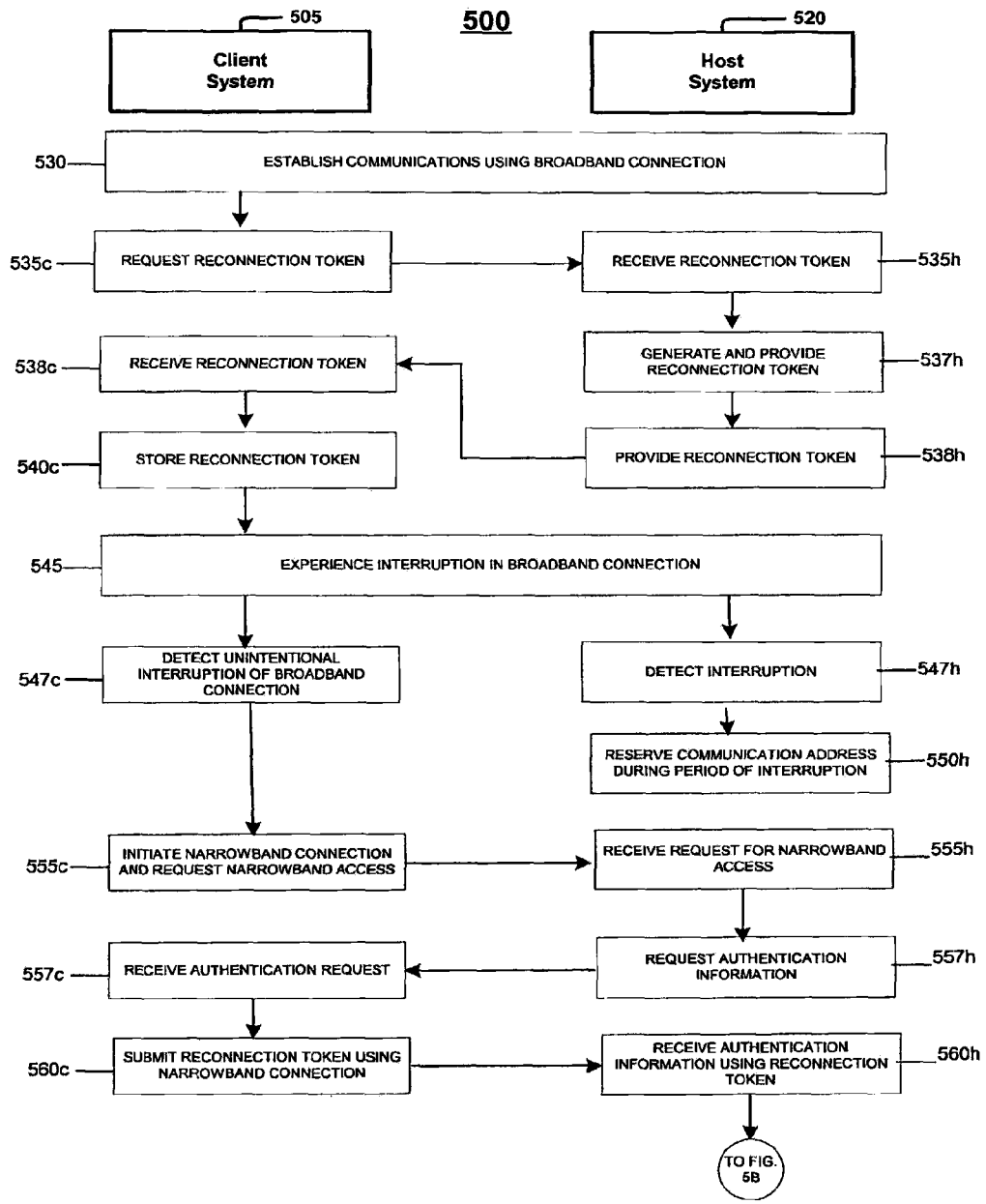
FIGS. 5A and 5B are block diagrams illustrating exemplary communications between a client system and a host system to provide transparent switching between a broadband connection and a narrowband connection to provide uninterrupted access to the host system.
Figure 5B:
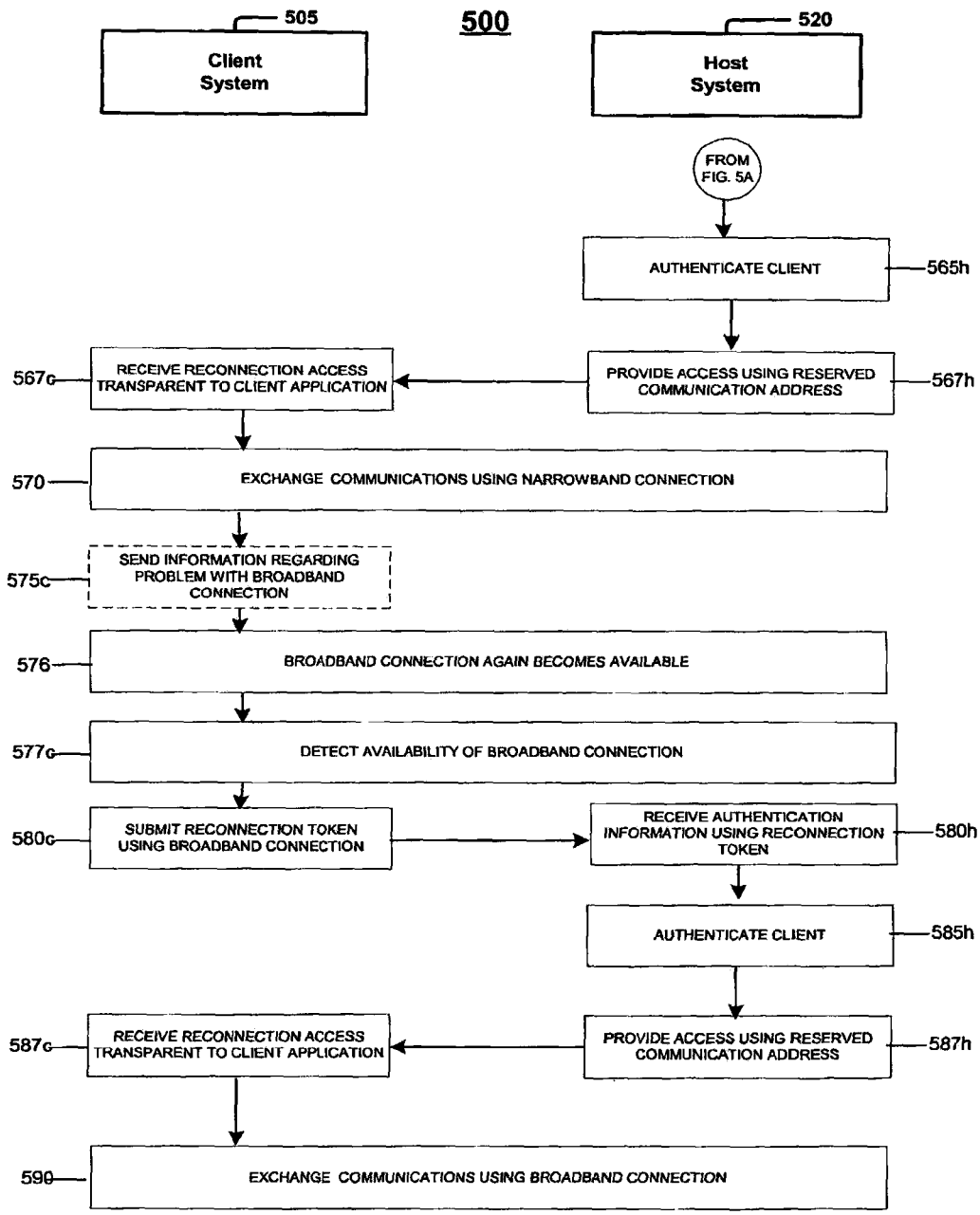

FIGS. 5A and 5B depict a process 500 to provide transparent reconnection of a communications session between the client system 505 and the host system 520 when the broadband connection is interrupted. The client system 505, for example, may be an implementation of the home-networking gateway 110 or the client system 105 both of FIG. 1, the client system 205 of FIG. 2, the protocol server module 377 or client system 305 both of FIG. 3, or the client system 410 of FIG. 4. The host system 520, for example, may be an implementation of the host system 120 of FIG. 1, the host system 220 of FIG. 2, the host system 320 of FIG. 3, or the host system 420 of FIG. 4.

The procedure 500 begins when a communications session using a broadband connection is established between the host system 520 and the client system 505, as described previously with respect to step 430 of FIG. 4 (step 530).

The client system 505 requests a reconnection token (step 535*c*), which may be used to reestablish communications between the client system 505 and the host system 520 after an unintentional interruption of the communications session. The reconnection token may be valid only for two submissions and may be valid only for a period of time, usually a short period of time, following an interrupted communications session.

The host system 520 receives the token request (step 535h). The host system 520 generates the reconnection token (step 537h). The generation of the reconnection token may include relating the reconnection token to the host-designated communications address, storing the reconnection token, the host-designated communication address and the relationship between the reconnection token and address.

The host system 520 provides the reconnection token to the client system (step 538h), which receives (step 538c) and stores the token (step 540c).

When the client system 505 and the host system 520 experience an interruption in the communications session (step 545), the client system 505 or the host system 520 may detect the interruption (steps 547c and 547h). However, to enhance security, it may be possible to limit detection of the interruption to the host system, thus reducing the opportunities for spoofing of authentic tokens.

When the host system 520 detects the interruption based on criteria other than receipt of an access request or token from a disconnected client system (step 547h), the host system reserves the communications address used in the interrupted communications session during the period of interruption (step 550h). The host system may limit the duration of the reservation for a specific period of time (which may be referred to as the lifespan of the token) that is measured from the time of communications session interruption. This may be accomplished, for example, by having a list or table of issued reconnection tokens and storing the client system to which the reconnection token was issued and the time of interruption, if any, for each issued reconnection token.

If, during the lifespan of the reconnection token, the host system 520 receives a request for access from the client system 505 without the client system submitting the reconnection token, the host system 520 may take any of several actions, including terminating the session immediately, continuing to wait for the submission of the reconnection token or the expiration of the lifespan of the reconnection token, and providing access using a host-designated communication address that is not the same as the reserved communication address.

The client system 505 detects an unintentional interruption of the broadband connection, such as described previously with respect to step 447c of FIG. 4 (step 547c). The client system 505 initiates a narrowband connection with the host system 520 and requests narrowband access from the host system, such as described previously with respect to step 455c of FIG. 4 (step 555c). The host system 520 receives the request for narrowband access (step 555h) and requests authentication information from the client system 505 (step 557h), such as described previously with respect to steps 455h and 457h of FIG. 4.

The client system 505 receives the authentication request (step 557c) and submits the reconnection token using the narrowband connection with the host system 520 (step 560c). More specifically, the client system may determine whether a reconnection token exists, retrieve the reconnection token from storage, and send the reconnection token to the host system. The reconnection token may be submitted automatically in lieu of or in addition to authentication information, unprompted, or in response to a request from the host system. Such a process generally preempts or replaces the display of a user interface soliciting reconnection or reauthentication information from a user.

Alternatively, the client system 505 may submit the reconnection token when the client system 505 initiates the narrowband connection and requests access to the host system 520.

The host system 520 receives the authentication information in the form of the token (step 560h). If the host system 520 has not yet otherwise detected the interruption of the communications session, receiving authentication information from a client system 505 using a reconnection token may enable the host system 520 to detect the communications session interruption.

Referring also to FIG. 5B, the host system 520 responds to receipt of authentication information by authenticating the client system (step 565h), which may involve determining whether the reconnection token submitted by the client system is valid (such as, by comparing the received reconnection token with a list of issued tokens, by looking up the reconnection token in a table that lists all valid reconnection tokens, or, if the reconnection token is time-limited or use-limited, determining whether it is expired). The host system 520 then provides access using the same communications address which was used in the interrupted broadband communications session in order to reestablish communications with the client system 505 (step 567h).

The client system 505 receives reconnection access such that at least one of the client applications making use of the communication session does not experience a disruption despite the communications session interruption; that is, at least one client application is unaffected by the interruption and the associated reconnection, which has been described previously with respect to FIG. 2 (step 567c). Moreover, some operating systems may terminate a client application upon loss of a connection to the host system on which the client application depends. An operating system on the client system 505, however, may be prevented from terminating a client application by masking the loss of the connection, for instance, using a local protocol module that "spoofs" the operating system protocol stack and host system, as described with respect to FIG. 3.

In some implementations, the client system 505 may receive reconnection access using the same session identifier that was associated with the interrupted session (step 567c).

The client system 505 and the host system 520 exchange communications using the narrowband connection (step 570). Optionally, the client system 505 may provide, without user intervention, information regarding the problem(s) leading or incident to an interruption, with the broadband connection to the host system 520, as described previously with respect to step 474c of FIG. 4. When the broadband connection again becomes available (step 576) and the client system 505 detects availability of the broadband connection (step 577c), the client system 505 submits to the host system 520 the reconnection token using the broadband connection (step 580c). In some implementations, the host system 520 may detect availability of the broadband connection (step 577c) and request from the client system 510 authentication information and/or the reconnection token. In response, the client system 510 submits the reconnection token using the broadband connection (step 580c).

The host system 520 receives authentication information from the client system 505 in the form of the reconnection token (step 580h), authenticates the client system 505 (step 585h), and provides access using the reserved communication address (step 587h). To provide access to the client system 505 using the reserved communication address, the host system 520 may disconnect the narrowband connection with the client system 510 that used the reserved communication address.

In some implementations, the client system 505 may receive reconnection access using the same session identifier that was associated with the interrupted session.

The client system 505 receives reconnection access transparent to at least one client application (step 587c), as described previously with respect to step 567c. The client system 505 and the host system 520 exchange communications using the broadband connection (step 590).

In some implementations, a single-use reconnection token may be used. In such a case, when the narrowband connection is established for communications between the host system 520 and the client system 505 (steps 555c-570c), the client system 505 may request and be provided a second reconnection token from the host system in a manner the same as or similar to that described previously in steps 535c-540c. The client system 505 may use the second reconnection token to transparently connect to the host system using the reestablished broadband connection when the broadband connection becomes available (step 580c).

Figure 6:
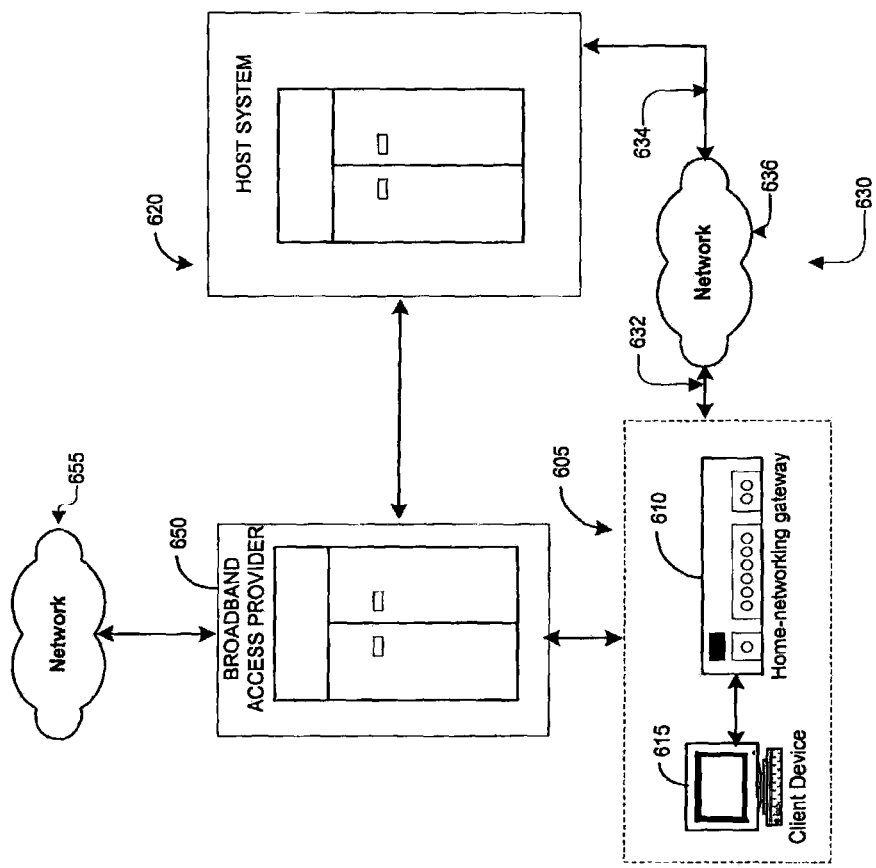
FIG. 6 is a block diagram showing a communications system capable of reporting, without user intervention, a problem with a broadband connection.

FIG. 6 illustrates a communications system 600 capable of reporting, without user intervention, a problem with a broadband connection between a client system and a broadband access provider. The communications system 600 includes a client system 605 that has a home-networking gateway 610 and a client device 615, a host system 620, and a broadband access provider 650, and a network 655.

The client system 605 may be an implementation of the client system 105 of FIG. 1. The home-networking gateway 610 generally maintains a persistent broadband connection to broadband access provider 650. The broadband persistent connection may be a connection using, for example, a cable modem, such as cable modem 130a of FIG. 1, or a DSL modem, such as DSL modem 130b of FIG. 1.

The broadband access provider 650 provides client system 610 with access to network 655, which may be an implementation of network 236 of FIG. 2 or network 336 of FIG. 3. The broadband access provider 650 may be a host system similar to the host system 120 of FIG. 1, the host system 220 of FIG. 2, the host system 320 of FIG. 3, the host system 420 of FIG. 4, or the host system 520 of FIGS. 5A and 5B. However, the broadband access provider 650 receives notification of an interruption, or other type of problem, with the broadband connection between the broadband access provider 650 and the client system 605 from the host system 620.

When the client system 605 detects an interruption of the broadband connection with the broadband access provider 650, the client system 605 establishes a transient connection (such as a narrowband or dial-up connection) with the host system 620 using communications link 630, which may be an implementation of communications links 230 of FIG. 2. The communications link 630 may include communications pathways 632 and 634 enabling communications through the one or more delivery networks 636.

The client system 605 and the host system 620 may exchange communications that include authentication messages used to establish a trusted connection. The client system 605 notifies the host system 620 of the interruption of the broadband connection with the broadband access provider 650. For example, the client system 605 may send an email message or other type of communication to the host system 620. The client system also may connect with a trouble reporting application of the host system 620 to report a problem with the broadband connection. The client system 605 may include diagnostic or other information, for example, obtained from the broadband communications device with the notification.

The host system 620 notifies the broadband access provider 650 of the problem with the broadband connection. In some implementations, the host system 620 may establish a persistent connection with the broadband access provider 650, and it may provide that broadband access provider 650 with information needed to rectify the reported problem, which information may or may not be obtained or solicited from the client system 605. A persistent connection may be particularly beneficial when the number of notifications or other types of communications routed between the broadband access provider 650 and the host system 620 is greater than the capacity afforded by a transient connection that requires authentication to be performed when a connection is established.

The host system 620 and the broadband access provider 650 may be owned or controlled by the same or different legal entities. Generally, the host system 620 and the broadband access provider 650 are different legal entities.

Although the techniques have been described using a host system and a client system, the techniques and concepts extend to systems communicating other than in a client and host relationship and therefore are applicable to other contexts. For example, the benefits may be applicable to systems that are accessible by a user system, such as a system in a point-to-point communications system or a trusted computer system that is not necessarily engaged in a host-client relationship with a user system. A system that is accessible by a user system may be referred to as an accessible system.

Although techniques have been described using a broadband connection and a narrowband connection, the techniques and concepts may be applicable to other types of connections.

The techniques and concepts are applicable to communications devices other than a gateway or a home-networking gateway. For example, a router, a digital hub, a general-purpose computer, or a single-purpose configuration management device may perform the functions described as being performed by the gateway. The gateway also may be referred to as a local proxy device.

Implementations may include a method or process, an apparatus or system, or computer software on a computer medium. It will be understood that various modifications may be made that still fall within the following claims. For example, advantageous results still could be achieved if steps of the disclosed techniques were performed in a different order and/or if components in the disclosed systems were combined in a different manner and/or replaced or supplemented by other components.

What is claimed is:

1. A method of switching between connectivity types for enabling communications between a mobile user device and a host, the method comprising:

establishing a first communications session between the mobile user device and the host over a wireless broadband connection, the first communications session enabling an application of the mobile user device to render Internet content received over the wireless broadband connection;

detecting a communication failure in the wireless broadband connection;

automatically establishing, in response to detecting the communication failure in the wireless broadband connection, a second communications session between the mobile user device and the host over a wireless mobile network connection, which is different in connectivity type from the wireless broadband connection; and leveraging the second communications session over the wireless mobile network connection to enable the application of the mobile user device to continue rendering Internet content despite the communication failure, using Internet content received over the wireless mobile network connection.

2. The method of claim 1, wherein the wireless broadband connection is a Wi-Fi connection to a wireless access point.

3. The method of claim 1, wherein a bandwidth of the wireless broadband connection is greater than a bandwidth of the wireless mobile network connection.

4. The method of claim 1, wherein the wireless mobile network connection comprises a Public Switched Telephone Network (PSTN).

5. The method of claim 1, further comprising:
authenticating, in response to establishing the first communications session of the wireless broadband connection between the mobile user device and the host, the user device.

6. The method of claim 5, wherein authenticating the user device includes receiving a user identifier.

7. The method of claim 6, wherein the user identifier includes one or more of a user name, a screen name, and a phone number.

8. The method of claim 6, wherein authenticating the user device includes receiving a password.

9. The method of claim 1, wherein the mobile user device is further configured to reconnect with the wireless broadband connection when the mobile user device detects a sufficiently strong signal from the wireless broadband connection.

10. The method of claim 1, wherein the mobile user device comprises at least one of a mobile phone or a Personal Digital Assistant (PDA).

11. The method of claim 1, wherein establishing the first communications session comprises establishing the first communications session with a home network gateway.

12. The method of claim 1, further comprising:
informing, in response to detecting the communication failure in the first communications session of the wireless broadband connection, a user of the mobile user device about the communication failure in the first communications session of the wireless broadband connection.

13. The method of claim 12, wherein informing the user of the mobile user device of the communication failure in the first communications session of the wireless broadband connection includes enabling display of a message regarding the detected communication failure in the first communications session of the wireless broadband connection.

14. The method of claim 1, wherein the communication failure in the first communications session of the wireless broadband connection is an interruption of the first communications session of the wireless broadband connection.

15. The method of claim 1, wherein establishing the second communications session over the wireless mobile network between the mobile user device and the host includes initiating the second communications session between the user device and the host over the wireless telephone network without user intervention.

16. The method of claim 1, further comprising:
periodically detecting, in response to detecting the communication failure in the first communications session over the wireless broadband network, renewed availability of the wireless broadband network;

determining that the wireless broadband network is available; and establishing, in response to determining that the wireless broadband network is available, a third communications session over the wireless broadband network between the mobile user device and the host.

17. The method of claim 16, wherein determining that the wireless broadband network is available includes receiving a data packet using the wireless broadband network.

18. The method of claim 16, further comprising:
terminating, in response to establishing the third communications session over the wireless broadband network, the second communications session over the wireless mobile network.

19. A tangible computer-readable medium having embodied thereon a computer program configured to enable communications between a mobile user device and a host, the computer program comprising one or more code segments that, when executed, cause a mobile user device processor to:
establish a first communications session between the mobile user device and the host over a wireless broadband connection, the first communications session enabling an application of the mobile user device to render Internet content received over the wireless broadband connection;

detect a communication failure in the wireless broadband connection;

automatically establish, in response to detecting the communication failure in the wireless broadband connection, a second communications session between the mobile user device and the host over a wireless mobile network connection, which is different in connectivity type from the wireless broadband connection; and leverage the second communications session over the wireless mobile network connection to enable the application of the mobile user device to continue rendering Internet content despite the communication failure, using Internet content received over the wireless mobile network connection.

20. A mobile user device configured to switch between connectivity types for enabling communications with a host, the mobile device comprising a processor connected to a storage device and one or more input/output devices, wherein the processor is configured to:
establish a first communications session between the mobile user device and the host over a wireless broadband connection, the first communications session enabling an application of the mobile user device to render Internet content received over the wireless broadband connection;

detect a communication failure in the wireless broadband connection;

automatically establish, in response to detecting the communication failure in the wireless broadband connection, a second communications session between the mobile user device and the host over a wireless mobile network connection, which is different in connectivity type from the wireless broadband connection; and leverage the second communications session over the wireless telephone network connection to enable the application of the mobile user device to continue rendering Internet content despite the communication failure, using Internet content received over the wireless mobile network connection.

* * * * *